United States Patent
Krishnan

(10) Patent No.: US 7,355,984 B1
(45) Date of Patent: Apr. 8, 2008

(54) METHOD AND SYSTEM FOR FINDING NETWORK NEIGHBOR INFORMATION

(75) Inventor: Manjeri Raghunathan Krishnan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1082 days.

(21) Appl. No.: 10/231,524

(22) Filed: Aug. 30, 2002

(51) Int. Cl.
H04L 12/28 (2006.01)
H04J 1/16 (2006.01)
G08C 15/00 (2006.01)
G06F 11/00 (2006.01)

(52) U.S. Cl. ............ 370/254; 370/228; 370/235; 709/227

(58) Field of Classification Search ........ 370/223–245, 370/254–374, 384–392, 400–403; 709/220–226; 398/43–79
See application file for complete search history.

(56) References Cited

U.S. PATENT DOCUMENTS

| | | | |
|---|---|---|---|
| 5,218,601 A * | 6/1993 | Chujo et al. ............ | 370/228 |
| 5,457,691 A * | 10/1995 | Romeijn ............... | 370/510 |
| 5,796,736 A * | 8/1998 | Suzuki ................ | 370/254 |
| 5,987,026 A * | 11/1999 | Holland ............... | 370/353 |
| 6,078,596 A * | 6/2000 | Wellbrock ............. | 370/352 |
| 6,188,675 B1 * | 2/2001 | Casper et al. .......... | 370/254 |
| 6,222,848 B1 * | 4/2001 | Hayward et al. ......... | 370/412 |
| 6,366,556 B1 * | 4/2002 | Ballintine et al. ....... | 370/216 |
| 6,385,201 B1 * | 5/2002 | Iwata ................. | 370/400 |
| 6,631,414 B2 * | 10/2003 | Bullock et al. .......... | 709/227 |
| 6,735,171 B2 * | 5/2004 | Takeguchi ............. | 370/235 |
| 6,862,624 B2 * | 3/2005 | Colby et al. ............ | 709/226 |
| 6,947,377 B1 * | 9/2005 | Shimano et al. ......... | 370/228 |
| 7,099,580 B1 * | 8/2006 | Bulbul ................ | 398/9 |
| 7,113,485 B2 * | 9/2006 | Bruckman ............. | 370/252 |
| 2003/0076789 A1 * | 4/2003 | Kimura et al. .......... | 370/254 |
| 2003/0091057 A1 * | 5/2003 | Miyashita et al. ....... | 370/428 |
| 2003/0214969 A1 * | 11/2003 | Cain et al. ............. | 370/443 |
| 2005/0193114 A1 * | 9/2005 | Colby et al. ............ | 709/226 |

OTHER PUBLICATIONS

The ATM Forum Technical Committee, "Integrated Local Management Interface (ILMI) Specification Version 4.0", Sep. 1996.

* cited by examiner

*Primary Examiner*—Man U. Phan
(74) *Attorney, Agent, or Firm*—Cindy Kaplan

(57) ABSTRACT

A method and system for discovering peer node information at a path terminating equipment node in a computer network are disclosed. The method generally includes transmitting from an originating node to a peer node a request for information in at least one SONET path overhead byte and receiving the requested information from the peer node at the originating node in the path overhead byte.

20 Claims, 3 Drawing Sheets

METHOD AND SYSTEM FOR FINDING NETWORK NEIGHBOR INFORMATION

BACKGROUND OF THE INVENTION

The present invention relates generally to communication networks, and more specifically, to a method and system for finding network neighbor information.

Communication in a computer network involves the exchange of data between two or more entities interconnected by communication links and subnetworks. Communication between computers within the network is made possible with the use of communication protocols, which govern how computers exchange information over a network. In order for proper operation of the protocols, it is important that the devices in the network are properly interconnected so that error free communication can occur across the network.

SONET and SDH are a set of related standards for synchronous data transmission over fiber optic networks. SONET is short for Synchronous Optical Network and SDH is an acronym for Synchronous Digital Hierarchy. A SONET system consists of switches, multiplexers, and repeaters, all connected by fiber. The connection between a source and destination is called a path. The Bellcore GR-253 standard defines SONET, which uses a layered architecture of Path, Line, and Section Overhead (POH, LOH, and SOH). The section, line, and path overheads contain a profusion of bytes used for operations, administration, maintenance, and provisioning (OAM&P).

Switches and other components within the SONET/SDH system are configured to have multiple cable connections (e.g., MGX8850 Multiservice Wide-Area Edge Switch, available from Cisco Systems Inc.). It is important that all of the cables hook up to the correct node, slot, backcard (bay), and line. Since there are often many connections, it is difficult to find a problem or check that all of the connections are correct when cables are moved or replaced.

The corresponding lines from the active and standby cards are hooked to the intended node, bay, and line on the far end. At a customer site, the problem often becomes compounded when many of the nodes do not exist in the same Central Office (or other location) and traverse through patch panels.

There are currently some layer 3 (network) and layer 4 (transport) protocols that provide peer node information, however, these all have limitations. One such protocol is ILMI (Interim Local Management Interface). ILMI allows management information to be exchanged between management entities within peers. The information is exchanged over a direct encapsulation of SNMP (Simple Network Management Protocol). ILMI, however, needs to be enabled at both ends. Also, the end points of ILMI need not be adjacent next hop nodes. ILMI also requires preset configurations on the nodes. PNNI (Private Network-to-Network Interface) is a suite of network protocols that can be used to discover an ATM network topology, create a database of topology information, and route calls over the discovered topology. PNNI has limitations similar to those described above for ILMI. Furthermore, neither of these protocols is able to run on standby cards. For example, when 1+1 APS is provisioned in card redundancy, the same data is propagated on the lines connected to the active and standby cards. Thus, protocols such as PNNI or ILMI are not useful in determining the neighbor information for the standby card.

Accordingly, there is a need for a method and system for easily determining where a given cable is connected to identify the peer node and other connection information.

SUMMARY OF THE INVENTION

A method and system for discovering peer node information at a path terminating equipment node in a computer network are disclosed.

The method generally includes transmitting from an originating node to a peer node a request for information in at least one SONET path overhead byte and receiving the requested information from the peer node at the originating node in the path overhead byte.

The information may include, for example, the name of the peer node, slot, bay, or line that the originating node is connected. The path overhead byte is preferably the F2 user channel byte.

In another aspect of the invention, a computer program product generally includes code that transmits from an originating node to a peer node a request for information in at least one SONET path overhead byte and code that receives the requested information from the peer node in the path overhead byte. The product further includes a computer-readable storage medium for storing the codes.

A system for discovering peer node information at a path terminating equipment node in a computer network generally comprises a processor operable to transmit a request for information in at least one SONET path overhead byte and receive the requested information from the peer node in the path overhead byte. The system also includes memory for at least temporarily storing the information.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The invention operates in the context of a data communication network including multiple network elements. Some of the nodes in a network that employs the present invention may be network devices such as routers and switches. Some of the nodes may be, for example, suitably configured switches such as those available from Cisco Systems, Inc. of San Jose, Calif. The system may be used in any node which is a path terminating equipment (PTE) to find the final PTE connection at the other end.

The method and system of the present invention use an F2 Path Overhead (POH) user data channel of SONET to transmit and receive peer node information. Since SONET is synchronous, frames are emitted whether or not there is any useful data to send. The first column of user data (called the synchronous payload envelope (SPE)) is the path overhead (i.e., header for the end-to-end path sublayer protocol). Path overhead is associated with the path layer and is carried from end-to-end (i.e., source to destination) and is used by the path terminating equipment (PTE). Path overhead contains nine bytes, one in each row in the first column of the SPE. The POH column includes the F2 User Channel. The path user channel byte provides a 64 Kbps user channel which can be used in a proprietary fashion between two PTEs.

The invention uses a layer 1 (physical) and layer 2 (data link) protocol to discover neighbor information for SONET/SDH and STM (synchronous transport module) PTE. As described further below, the system sends a request from an originating node to a peer node and receives a response containing information that can be used by the originating node to find out information about its neighbor node. The information transferred between nodes may include, for example, node name, slot, bay, node name, slot, bay, line, or node or port configurations such as number of connections or bandwidth of the port.

Figure 1:
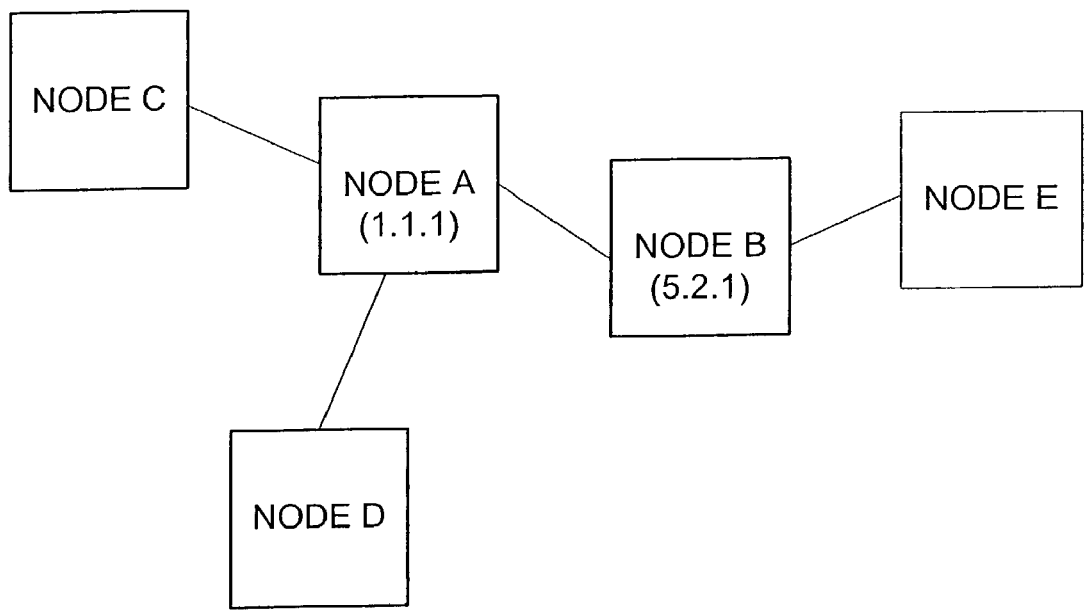
FIG. 1 is a diagram of a plurality of interconnected nodes within a computer network system.

FIG. 1 is a block diagram illustrating a plurality of interconnected nodes within a computer network system. Node A, slot 1, bay 1, line 1 (denoted as 1.1.1) is connected to node B (5.2.1). Node A is also connected to Node C and Node D (which are also peer nodes to Node A). Node B is also connected to Node E. It is to be understood that the network shown in FIG. 1 is merely an example. Each node may be connected to any number of nodes and the network may have many different configurations. Only one of the end nodes needs to run the protocol described herein. The other end node only needs to understand the protocol.

Figure 2:
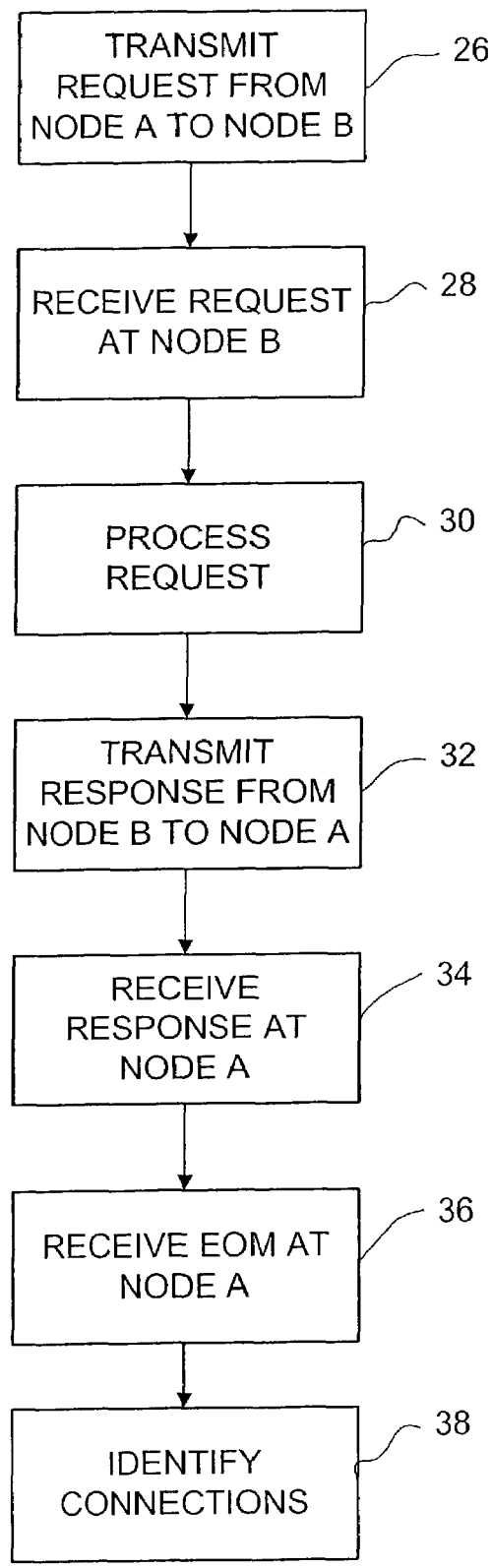
FIG. 2 is a flowchart illustrating a process for discovering network neighbor information.

FIG. 2 is a flowchart illustrating a process for using the system to discover neighbor information. As shown in the block diagram of FIG. 1, Node A and Node B are neighbor nodes. In order to find out information about its neighbor, node A transmits a request from Node A to Node B (step 26). Upon receipt of the request at Node B (step 28), Node B processes the request (step 30). Node B then transmits the requested information on the F2 path overhead byte to Node A (step 32). After transmission of all necessary information, Node B sends and End of Message (EOM) in the F2 byte. Node A receives the information sent by Node B including the EOM (steps 34 and 36). The request format may include the following fields, for example: Code; Command; Node; Slot; and Line. Each of the fields may be a byte in length except for the Code field, which is preferably 2 bits. The Code field identifies the source of message and the type of command (i.e., request or response). For example, the Code field may use the following representation of bits: Request 00; Response 01; Hello 10; Unused 11. The Command field determines the type of request such as node information, bandwidth information, etc.

The values received in the response may be used to determine if the lines from the active card and standby card are connected to the next PTE correctly (step 38). The Response may include the same fields described above for the Request. The Command field of the Response will be all zeros.

A protocol of the invention may be run on active or standby cards. If the protocol is run on the active card, the protocol is triggered to also run on the standby card. The protocol may be used as a neighbor discovery protocol and can be used in cases where traditional protocols (e.g., ILMI or PNNI) are not available. For example, the protocol may be used for 'keep-alive' messaging. The system may also be used for rerouting for legacy products that do not support any sophisticated routing functionality.

Figure 3:
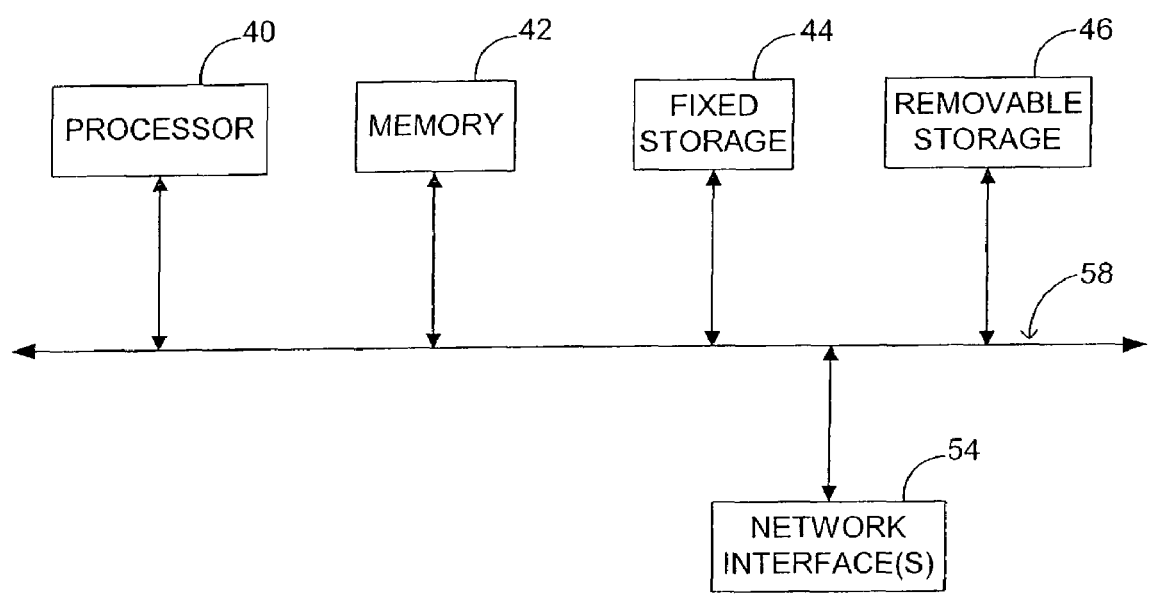
FIG. 3 is a diagram illustrating an example of a computer system that can be utilized to execute software of an embodiment of the present invention.

In one embodiment, the system may be implemented in firmware inserted into programmable read-only memory and run on a card in a chassis. FIG. 3 shows a system block diagram of system that may be used to execute software (or firmware) of an embodiment of the invention. The computer system may include subsystems such as a central processor 40, system memory (including read-only memory for firmware) 42, removable storage 46 (e.g., CD-ROM drive), and a hard drive 44 which can be utilized to store and retrieve software programs incorporating computer code that implements aspects of the invention, data for use with the invention, and the like. The computer readable storage may also include flash memory, or system memory. Other computer systems suitable for use with the invention may include additional or fewer subsystems. For example, the computer system may include more than one processor 40 (i.e., a multi-processor system) or a cache memory.

The system bus architecture of the computer system is represented by arrows 58 in FIG. 3. However, these arrows are only illustrative of one possible interconnection scheme serving to link the subsystems. For example, a local bus may be utilized to connect the central processor 40 to the system memory 42. The components shown and described herein are those typically found in most general and special purpose computers and are intended to be representative of this broad category of data processors. The computer system shown in FIG. 3 is only one example of a computer system suitable for use with the invention. Other computer architectures having different configurations of subsystems may also be utilized.

Communication between computers within the network is made possible with the use of communication protocols, which govern how computers exchange information over a network. The computer may include an input/output circuit used to communicate information in appropriately structured form to and from parts of the computer and associated equipment. Preferably, each of these interfaces includes a plurality of ports appropriate for communication with the appropriate media, and associated logic, and in some instances memory. The associated logic may control such communication intensive tasks as packet integrity checking and media control and management.

As can be observed from the forgoing, the present invention provides numerous advantages. For example, the invention includes a layer 1 and 2 protocol and as such does not need any preset configuration as required by layer 3 and 4 protocols. Furthermore, the protocol is designed to determine the next hop node information, unlike other protocols which typically execute end-to-end or need to be configured on both ends. As described above, the system of the present invention can be run on standby or active cards, whereas, layer 3 and 4 protocols do not run on standby cards.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for discovering peer node information at a path terminating equipment node in a computer network, the method comprising:
    transmitting from an originating node to a peer node a request for information about the peer node in at least one SONET path overhead byte, wherein the originating node and the peer node comprise path terminating equipment;
    receiving said requested information from the peer node at the originating node in said at least one path overhead byte; and
    identifying connections from active and standby cards at the originating node to the peer node based on said requested information received in said at least one path overhead byte;
    wherein said request for information is transmitted over a SONET path to the path terminating equipment peer node and said requested information comprises slot information for said active and standby cards.

2. The method of claim 1 wherein the path overhead byte is the F2 user channel byte.

3. The method of claim 1 wherein receiving information comprises receiving the name of the peer node.

4. The method of claim 1 wherein receiving information comprises receiving information identifying a bay of the peer node which the originating node is connected.

5. The method of claim 1 wherein receiving information comprises receiving information identifying a line of the peer node which the originating node is connected.

6. The method of claim 1 further comprising receiving an end of message in said at least one path overhead byte following receipt of all of said requested information.

7. A computer-readable medium encoded with stored computer-executable instructions for discovering peer node information at a path terminating equipment node in a computer network, the instructions comprising:
    code that transmits from an originating node to a peer node a request for information in at least one SONET path overhead byte, wherein the originating node and the peer node comprise path terminating equipment;
    code that receives said requested information from the peer node at the originating node in said at least one path overhead byte; and
    code that identifies connections from active and standby cards at the originating node to the peer node based on said requested information received in said at least one path overhead byte;
    wherein said request for information is transmitted over a SONET path to the path terminating equipment peer node and said requested information comprises slot information for said active and standby cards.

8. The computer-readable medium of claim 7 wherein the path overhead byte is the F2 user channel byte.

9. A system for discovering peer node information at a path terminating equipment node in a computer network, the system comprising a processor operable to transmit a request for information in at least one SONET path overhead byte to a path terminating peer node, receive said requested information from the peer node in said at least one path overhead byte, and identify connections from active and standby cards at the originating node to the peer node based on said requested information received in said at least one path overhead byte, and memory for at least temporarily storing the information; wherein said request for information is transmitted over a SONET path to the path terminating equipment peer node and said requested information comprises slot information for said active and standby cards.

10. The system of claim 9 wherein the path overhead byte is the F2 user channel byte.

11. The system of claim 9 wherein the information comprises the name of the peer node.

12. The system of claim 9 wherein the information comprises identification of a bay of the peer node that the originating node is connected.

13. The system of claim 9 wherein the information comprises identification of a line of the peer node that the originating node is connected.

14. A system for discovering peer node information at a path terminating equipment node in a computer network, the system comprising:
    means for transmitting from an originating node to a peer node a request for information in at least one SONET path overhead byte, wherein the originating node and the peer node comprise path terminating equipment;
    means for receiving said requested information from the peer node at the originating node in said at least one path overhead byte; and
    identifying connections from active and standby cards at the originating node to the peer node based on said requested information received in said at least one path overhead byte;
    wherein said request for information is transmitted over a SONET path to the path terminating equipment peer node and said requested information comprises slot information for said active and standby cards.

15. The method of claim 6 wherein the end of message is received from the peer node.

16. The method of claim 1 wherein said requested information comprises bandwidth of a port.

17. The method of claim 1 wherein at least one of the originating node and the peer node do not operate Interim Local Management Interface (ILMI) or Private Network-to-Network Interface (PNNI) protocols.

18. The method of claim 1 wherein said requested information further comprises identification of a bay and line of the peer node connected to the originating node and bandwidth of a port at the peer node.

19. The method of claim 1 wherein transmitting said request for information comprises transmitting periodic keep-alive messages.

20. The method of claim 1 wherein identifying connections from active and standby cards comprises utilizing only layer 1 and layer 2 protocols.

* * * * *